(No Model.) 2 Sheets—Sheet 1.
A. McI. WILLIAMSON.
TIRE FASTENING.
No. 571,872. Patented Nov. 24, 1896.
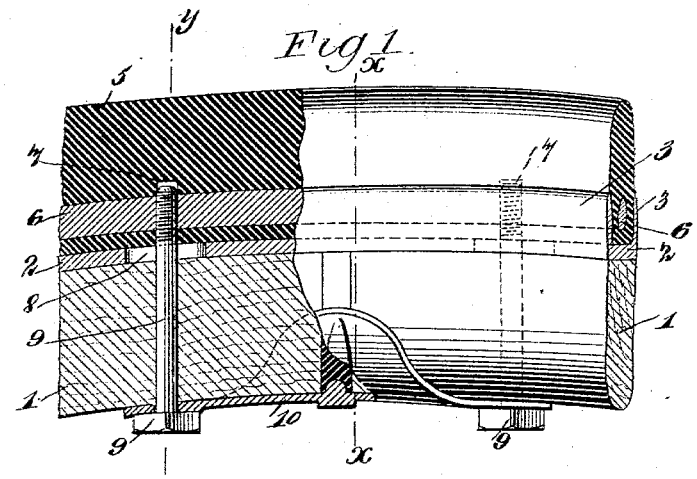
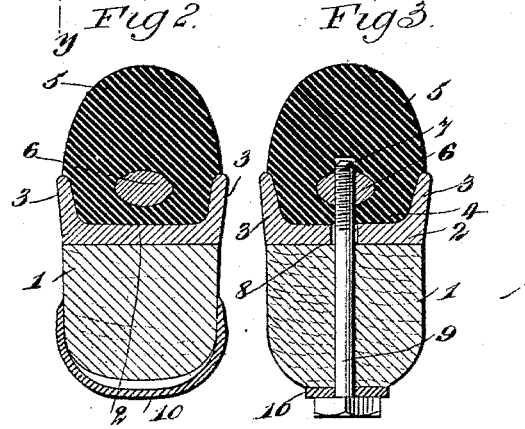
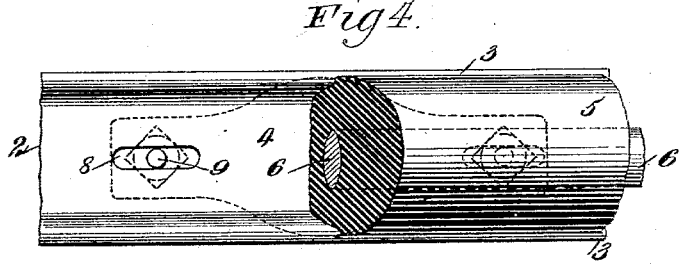
WITNESSES:
INVENTOR
A. McI. Williamson
BY Munn & Co.
ATTORNEYS.

(No Model.) 2 Sheets—Sheet 2.

A. McI. WILLIAMSON.
TIRE FASTENING.

No. 571,872. Patented Nov. 24, 1896.

WITNESSES:
Paul Jost
Isaac B. Owens

INVENTOR
A. McI. Williamson
BY Munn & Co.
ATTORNEYS.

UNITED STATES PATENT OFFICE.

ANGUS McINTOSH WILLIAMSON, OF PHILADELPHIA, PENNSYLVANIA.

TIRE-FASTENING.

SPECIFICATION forming part of Letters Patent No. 571,872, dated November 24, 1896.

Application filed November 2, 1895. Serial No. 567,697. (No model.)

*To all whom it may concern:*

Be it known that I, ANGUS McINTOSH WILLIAMSON, of Philadelphia, in the county of Philadelphia and State of Pennsylvania, have invented certain new and useful Improvements in Tire-Fastenings for Rubber-Tire Wheels, of which the following is a full, clear, and exact description.

This invention relates to an improved construction for securing rubber tires to the fellies of vehicle-wheels; and it has for its object to provide means whereby the tire may be secured with less liability to accidental removal than heretofore and whereby the fastening of the tire will not cut or otherwise destroy the rubber of the same.

It is further an object of the invention to provide superior means for holding in place the adjacent ends of the tire-securing rod.

The invention will be fully described hereinafter and finally embodied in the claims.

Reference is to be had to the accompanying drawings, forming a part of this specification, in which similar characters of reference indicate corresponding parts in all the figures.

Figure 5:
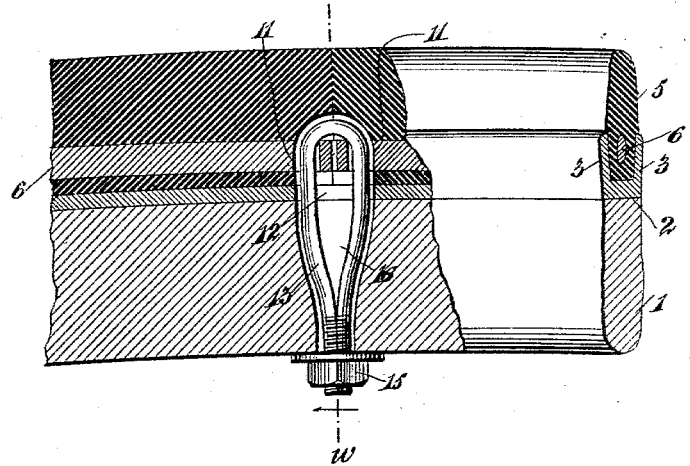
Figure 6:
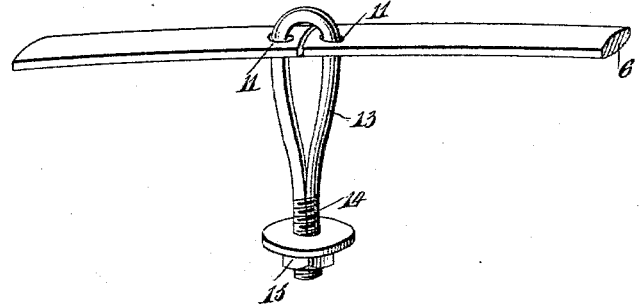
Figure 7:
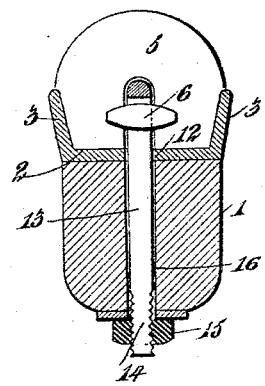

Figure 1 is a side elevation of a portion of a vehicle-tire constructed in accordance with my invention, parts being shown in section. Fig. 2 is a sectional view on the line $x\ x$ of Fig. 1. Fig. 3 is a sectional view on the line $y\ y$ of Fig. 1. Fig. 4 is a plan view of the tire with parts broken away. Fig. 5 is a view similar to Fig. 1 and showing the means for holding the contiguous ends of the rod in place. Fig. 6 is a perspective view of the said rod and the fastening device for its ends, said parts being dissociated from the other parts; and Fig. 7 is a sectional view on the line $w\ w$ of Fig. 5.

Referring particularly to Figs. 1 to 4, inclusive, the felly 1 is of the usual construction and provided with a plane periphery, upon which a band 2 is secured, the said band having side flanges 3, which form a channel, and in this channel the inner portion of the rubber tire 5 is arranged, the tire being shaped to conform to the shape of the said channel.

Passed through the tire 5 and arranged near the inner portion thereof is a metallic rod 6, which encircles the band 2 and which is concentric to the same. Passed through the felly 1, and one contiguous to each end of each felly-section, is a bolt 9, the head of which is located at the inner side of the felly and bears upon a clip-plate 10, the plate being of the usual construction. The inners ends of the bolts 9 are threaded and passed first through longitudinally-elongated slots 8 in the band 2, thence through the inner portions of the tire 5 to the rod 6, in which the bolts are screwed, as best shown in Figs. 1 and 3, the outer extremities of the bolts being respectively seated within recesses 7, formed in the tire 5. By means of the elongated slots 8 the band 2 may be shrunk on the felly and the parts otherwise adjusted without requiring a nicety of measurement to effect the registry of the parts, all of which will be understood.

By means of the above-described devices the tire 5 is held firmly on the felly and prevented from accidental disengagement. Owing to the oval or elliptical shape of the rod 6, said rod is prevented from cutting into the rubber and thereby destroying the same, and the flanges 3 of the band 2 hold the tire 5 against being twisted off the said band.

Referring to Figs. 5 to 7, inclusive, the opposing extremities of the rod 6 are each provided with an opening 11, and the band 2 is provided, adjacent to said openings 11, with a longitudinally-elongated opening 12. Passed through the openings 11 and 12 is the loop-bolt 13, the same being formed of an integral length of material bent to form a loop and having its terminals 14 formed semicircular and threaded on their curved portions, so that when brought together they will jointly have a circular cross-section, permitting the nut 15 to be secured on the bolt.

The felly is formed with a recess 16, which is alined with the openings 11 and 12, and said recess is substantially an enlarged passage, the same being provided for the reception of the bolt 13. In securing these parts in place the tire 5 and rod 6 are first placed in position and the opposing ends of the tire 5, as shown in Fig. 5, are pushed back, so that the extremities of the rod 6 will be exposed, whereupon the sections or arms of the bolt 13 are respectively passed through the openings 11, the nut 15 of the said bolt having been previously removed. The bolt is now pushed inwardly as far as possible until its ends 14 project inwardly from the felly 1, whereupon the nut 15 and its associated washer are placed in position and the parts tightened. This operation will result in drawing inwardly and together the extremities of the rod 6, so that the parts will assume the position shown in Figs. 5 and 7. The tire 5 should now be permitted to return and the adjacent edges of the tire secured by cement or other preferred means.

In constructing heavy wheels it may be desirable to divide the rod 6 into numerous sections, so that they may be independently removed for the purpose of repair. By these means the repair of that damage necessarily incident to the operation of heavy vehicles is rendered cheaper and easier than otherwise. Under ordinary conditions, however, it is my purpose to have the rod 6 in a single integral section. It will be observed that by means of this construction all welding of the rod 6 and similar methods of securing its ends are obviated and the rod held not only securely, but removably. The tire 5 also may be constructed in as many sections as desired and its ends cemented, as will be understood.

Having thus described my invention, I claim as new and desire to secure by Letters Patent—

1. A wheel-tire fastening, comprising a felly, a band secured on the felly and having outwardly-projecting side flanges forming a channel, a resilient tire seated in said channel, a rod passed through the tire and having each of its opposing ends formed with an opening, and a loop-bolt passed through the openings in the rod, and also through the band and felly and secured in place, substantially as described.

2. A tire-fastener, comprising a felly, a resilient tire located on the felly, a rod holding the resilient tire, the ends of the rod being located adjacent to each other, and a loop-bolt connected with said ends and passed through the felly, substantially as described.

ANGUS McINTOSH WILLIAMSON.

Witnesses:
 ISAAC B. OWENS,
 T. W. HANAFORD.